Patented Mar. 6, 1928.

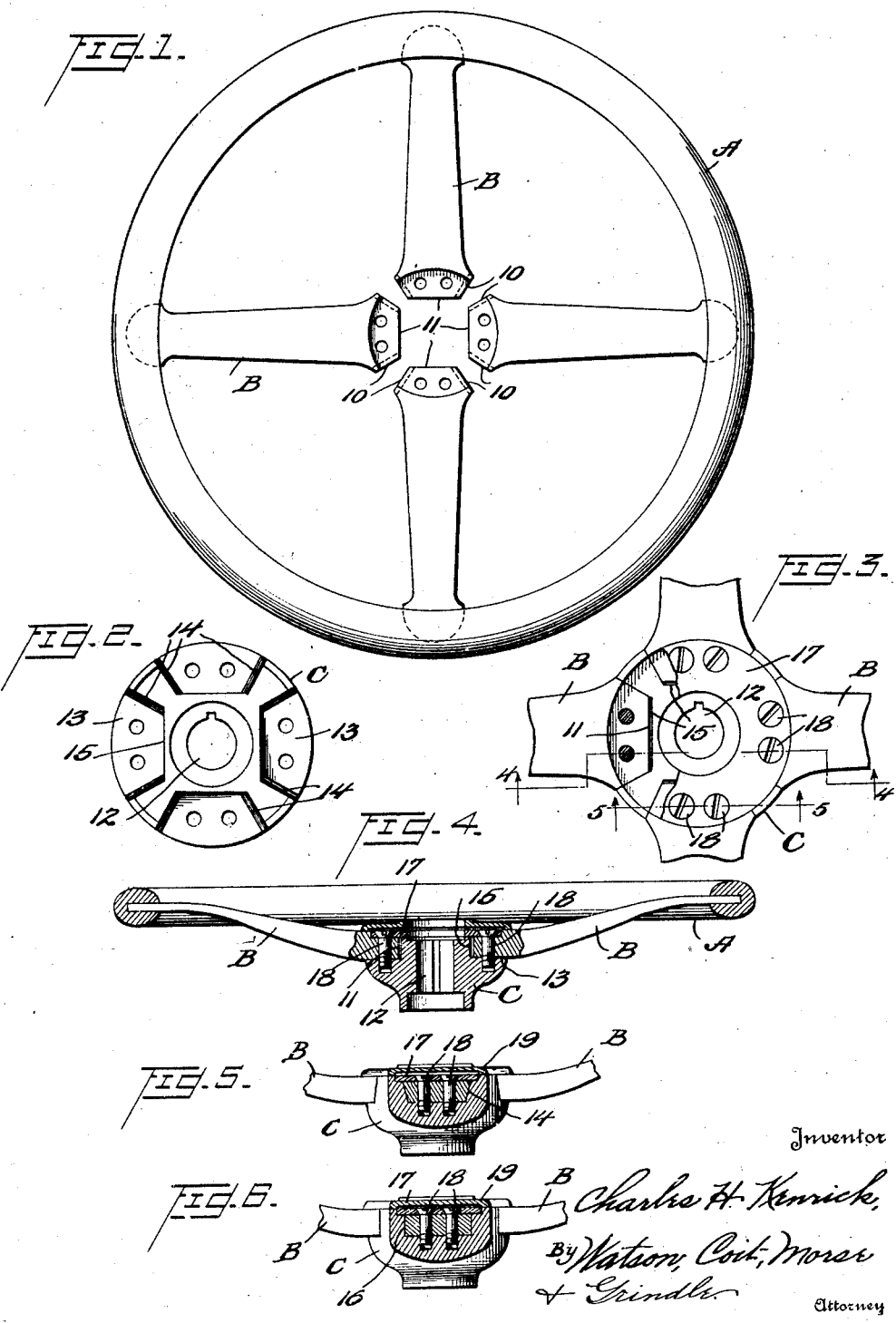

1,661,481

UNITED STATES PATENT OFFICE.

CHARLES H. KENRICK, OF ONAWAY, MICHIGAN, ASSIGNOR TO LOBDELL-EMERY MANUFACTURING COMPANY, OF ALMA, MICHIGAN, A CORPORATION OF MICHIGAN.

STEERING WHEEL.

Application filed December 23, 1925. Serial No. 77,348.

This invention relates to steering wheels for motor vehicles and more particularly to improvements upon the steering wheel shown and described in United States Letters Patent #1,540,992 issued to me June 9, 1925.

In the steering wheel described in this patent the spokes are dove-tailed into the hub and must be inserted into the hub radially before they are secured to the rim. This necessitates cutting away the rim on its upper or lower side to receive the ends of the spokes and then fitting into the rim and securing over the ends of the spokes blocks to complete the contour of the rim, as the rim must be of substantially the same section throughout and adapted to be grasped where the spokes enter it as well as between the spokes.

According to the present invention the radial sides of the sockets in the hub flare outwardly, or away from each other, toward the outer open faces of the sockets and the inner ends of the spokes are formed to fit the sockets. This permits the spokes to be inserted radially in mortises in the rim and secured therein before they are secured to the hub, thus saving the expense of cutting open-sided sockets in the rim and filling the same with blocks and also the additional finishing operation to shape the blocks accurately to the contour of the rim. In some instances the radial side walls of the sockets in the hub may be in substantially axial planes instead of being flared outwardly toward their open sides, but I prefer the latter form as it facilitates the assembling of the spokes in the hub and permits of more securely clamping them therein.

In the drawing:

Figure 1 is a plan view showing four wooden spokes assembled in a continuous wooden rim and ready to be applied to the hub;

Figure 2 is a plan view of the hub casting ready to receive the spokes;

Figure 3 is a plan view showing the clamping ring partly broken away and beneath it the spokes assembled in the hub;

Figure 4 is a cross section through the complete wheel about on the line 4—4 of Fig. 3;

Figure 5 is a cross section about on the line 5—5 of Fig. 3; and

Figure 6 is a section similar to Fig. 5, illustrating a modification.

Referring to the drawing, A indicates the rim of the steering wheel, B the spokes and C the hub to which the spokes are attached and which is adapted to be secured to the steering column of an automobile or other motor vehicle. The rim A is a continuous wooden rim formed of a series of sections securely glued together as is customary in manufacturing the best type of steering wheels. The spokes B are preferably reversely curved as shown in Fig. 4, their outer ends being relatively thin and broad and inserted in slots mortised in the inner periphery of the rim. The inner ends of the spokes are preferably thicker and broader than the outer ends and they terminate in approximately radial edges 10 to the extreme ends 11 being preferably at right angles to the length of the spokes.

The hub C is circular and provided with a central opening 12 to receive the steering post or steering column of the vehicle. The hub is provided, as shown, with four sockets 13 to receive the inner ends of the spokes. The sockets have approximately radial side walls 14 and tangential inner walls 15 and are thus adapted to receive the inner ends of the spokes, which should quite accurately fit the sockets. The side walls 14 of the sockets 13 preferably flare outwardly from the bottoms of the sockets as illustrated in Fig. 5. The amount of flare given to these side walls may be varied and in some instances the walls may be parallel axially as illustrated at 16 in Fig. 6. The form shown in Fig. 5, however, is preferred, as it facilitates easy assembling of the spokes in the hub and more secure attachment by means of the clamping devices to be presently described.

It will be apparent that the rim and spoke assembly shown in Fig. 1 may be fitted instantly to the hub structure shown in Fig. 2. It remains to clamp the spokes to the hub securely to withstand the torque or torsional strain which is applied in steering. This is accomplished as shown by applying an annular plate or ring 17 to the upper sides of the spokes and drawing the plate down upon the spoke ends by means of screws which are threaded into the hub. As shown, two screws 18 pass through the ring and through the inner end of each spoke, the screws being threaded into the hub. The broad inner ends of the spokes facilitate the clamping, as they permit of the use of two substantial screws or bolts in each spoke end. As the ring 17 is drawn down by the screws the spokes are securely clamped in the sockets 13. A cover 19 may be used to hide the clamping ring and the heads of the screws, thus giving the hub a more pleasing appearance.

The important feature of the invention is the structure which facilitates the assembling of the spokes in the hub after the spokes are secured to the rim thus saving several operations and considerable time in the manufacture of the wheels. The outer ends of the spokes may be securely glued in the mortises in the rim before the spokes are applied to the hub, thus obviating the necessity of cutting away parts of the rim to permit of inserting the spokes laterally and the necessity of filling the gaps thus made to restore the rim to its usual cross section. The outer ends of the spokes are wide and joints may be made with the rim which are perfectly secure without the use of screws, which are now commonly used.

Having described my invention, what I claim and desire to secure by Letters Patent is:

1. A steering wheel consisting in a continuous wood rim mortised in its inner periphery to receive the outer ends of the spokes, four rigid wooden spokes having their outer ends fitted securely in the mortises in the rim, a hub having sockets in one face normally registering with the inner ends of the assembled spokes and into which the inner ends of the spokes may be fitted after they are assembled in the rim, the side walls of the sockets converging toward the axis of the wheel and the sockets being shaped to receive the spoke ends in an axial direction, a ring fitting over the inner ends of the spokes, and means for clamping the ends of the spokes between the ring and hub, said inner ends of the spokes being broad in a circumferential direction and thinner axially of the wheel.

2. A steering wheel consisting in a continuous wood rim mortised in its inner periphery to receive the outer ends of the spokes, four rigid wooden spokes having their outer ends fitted securely in the mortises in the rim, a hub having four sockets in one face normally registering with the inner ends of the assembled spokes and into which the inner ends of the spokes may be fitted after they are assembled in the rim, the side walls of said sockets converging toward the axis of the wheel and flaring outwardly axially of the wheel toward the open sides thereof, a ring fitting over the inner ends of the spokes, and means for clamping the ends of the spokes between the ring and hub, said inner ends of the spokes being broad in a circumferential direction and thinner axially of the wheel and said clamping means comprising screws which pass through the inner ends of the spokes.

In testimony whereof I hereunto affix my signature.

CHARLES H. KENRICK.